United States Patent
Gray et al.

(10) Patent No.: US 7,837,541 B2
(45) Date of Patent: Nov. 23, 2010

(54) METHOD FOR REDUCING OUTSIDE AIR INFLOW REQUIRED FOR AIRCRAFT CABIN AIR QUALITY

(75) Inventors: John C. Gray, Shoreline, WA (US); Kyle D. Eilers, Everett, WA (US); Warren A. Atkey, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1013 days.

(21) Appl. No.: 11/637,993

(22) Filed: Dec. 13, 2006

(65) Prior Publication Data

US 2010/0203818 A1    Aug. 12, 2010

(51) Int. Cl.
B64D 13/04 (2006.01)
B64D 13/02 (2006.01)
B64D 11/00 (2006.01)

(52) U.S. Cl. .............. 454/74; 454/70; 454/71; 454/75; 454/76; 244/118.5

(58) Field of Classification Search ............ 454/70, 454/71, 72, 73, 74, 75, 76; 244/118.5
See application file for complete search history.

(56) References Cited

U.S. PATENT DOCUMENTS

| | | | | |
|---|---|---|---|---|
| 4,553,474 A | * | 11/1985 | Wong et al. | 454/74 |
| 4,742,761 A | * | 5/1988 | Horstman | 454/74 |
| 5,083,451 A | * | 1/1992 | Kling | 73/49.2 |
| 5,186,681 A | * | 2/1993 | Emmons | 454/74 |
| 5,695,396 A | * | 12/1997 | Markwart et al. | 454/76 |
| 5,791,982 A | * | 8/1998 | Curry et al. | 454/74 |
| 6,491,254 B1 | * | 12/2002 | Walkinshaw et al. | 244/118.5 |
| 6,544,114 B2 | * | 4/2003 | Buchholz | 454/74 |
| 6,551,184 B1 | * | 4/2003 | Mayer et al. | 454/76 |
| 6,666,039 B2 | * | 12/2003 | Mitani et al. | 62/172 |
| 6,676,504 B2 | * | 1/2004 | Petri et al. | 454/72 |
| 6,681,592 B1 | | 1/2004 | Lents et al. | |
| 2007/0088493 A1 | * | 4/2007 | Sterner | 701/123 |
| 2008/0115837 A1 | * | 5/2008 | Gray | 137/102 |

\* cited by examiner

*Primary Examiner*—Steven B McAllister
*Assistant Examiner*—Patrick F. O'Reilly, III

(57) ABSTRACT

A method for reducing outside air inflow required for aircraft passenger cabin air quality is provided. The method determines when passenger cabin air quality is the driving outside air inflow requirement and reduces the outside air inflow to that required for passenger cabin air quality. In one embodiment, there is provided a method for reducing outside air inflow required for aircraft passenger cabin air quality using a fixed minimum outflow valve open area setpoint. In another embodiment, there is provided a method for reducing outside air inflow required for aircraft passenger cabin air quality using calculations that are repeated at regular intervals and using a mathematical function relating an outside air inflow requirement to a set of independent variables. In another embodiment, there is provided a method for calculating an aircraft fuselage leakage value and communicating the fuselage leakage value and an increase in a fuel consumption rate due to an additional amount of outside air inflow required to replenish air loss due to fuselage leakage, due to aerodynamic drag, and due to reduced thrust recovery.

17 Claims, 1 Drawing Sheet

METHOD FOR REDUCING OUTSIDE AIR INFLOW REQUIRED FOR AIRCRAFT CABIN AIR QUALITY

BACKGROUND OF THE INVENTION

1) Field of the Invention

A method for reducing outside air inflow required for aircraft cabin air quality is provided. More particularly, a method for reducing outside air inflow required for aircraft cabin air quality based on aircraft operating parameters is provided.

2) Description of Related Art

Known commercial and military aircraft supply either a fixed or variable outside air inflow based on satisfying a plurality of requirements, one of which, passenger cabin air quality, is directly affected by leakage of air from within the aircraft pressurized volume to the ambient environment, commonly referred to as fuselage leakage. Traditionally, the fuselage leakage has been assumed a conservatively high constant value associated with an older aircraft. Therefore, the outside air inflow required for passenger cabin air quality can be significantly less for a newer aircraft with lower fuselage leakage. This traditional fuselage leakage assumption can reduce aircraft efficiency. Conversely, the outside air inflow required for passenger cabin air quality can be significantly greater for an aircraft with higher fuselage leakage. In this case, the traditionally assumed fuselage leakage value will degrade passenger cabin air quality. In addition, there are no feedback or alert methods to flight crews regarding aircraft fuselage leakage until the aircraft pressurized volume pressure setpoint can no longer be maintained.

Devices that pressurize and transport outside air into the aircraft pressurized volume consume energy proportional to the outside air inflow rate and differential pressure between the ambient environment and the pressurized volume which includes the passenger cabin. When the driving outside air inflow requirement is passenger cabin air quality, i.e., when the ventilation, temperature control, smoke penetration from one compartment to another, displacement of contaminated air, repressurization, and all other outside air inflow requirements are numerically lower, a reduction in fuselage leakage decreases the passenger cabin air quality outside air inflow requirement. This allows the aircraft to be operated with less outside air inflow and greater energy efficiency. Aircraft fuselage leakage increases with vehicle age, primarily due to an increase in door seal leakage. Maintenance of door seals is usually performed following flight crew observation of cabin pressure problems, such as an inability of the aircraft to meet its pressurized volume pressure setpoint, or due to increased passenger cabin noise level. Outside air inflow requirements for passenger cabin air quality typically assume a conservatively high fuselage leakage value. Therefore, every flight hour when the actual fuselage leakage value is numerically lower and passenger cabin air quality is the driving outside air inflow requirement, unnecessary outside air is pressurized, transported from the ambient environment into the fuselage and discharged overboard. Accordingly, there is a need for a method for reducing outside air inflow required for aircraft passenger cabin air quality that does not have the problems associated with known methods.

SUMMARY OF THE INVENTION

This need for a method for reducing outside air inflow required for aircraft passenger cabin air quality that does not have the problems associated with known methods, as well as unique, nonobvious, and advantageous embodiments, is provided. None of the known methods provides all of the numerous advantages discussed herein. Unlike known methods, embodiments of the method for reducing outside air inflow required for aircraft passenger cabin air quality may provide one or more of the following advantages: controls the aircraft pressurized volume outside air inflow based on a predetermined set of parameters and thereby reduces the energy consumed to supply air from the ambient environment to the aircraft pressurized volume; determines when passenger cabin air quality is the driving outside air inflow requirement; reduces the outside air inflow to that required for passenger cabin air quality; results in less power use by the compressed air source; reduces fuel consumption related to the energy consumed by the compressed air source; allows the air inflow to be limited to that needed for the actual aircraft operating parameters; may be used in commercial and military aircraft outside air inflow systems, commonly known as environmental control systems; may use logic to calculate an aircraft fuselage leakage value and to communicate the fuselage leakage value and increased engine fuel consumption due to the outside air inflow required to replenish air loss from the fuselage leakage and due to aerodynamic drag and due to reduced thrust recovery, thrust recovery being the force on the aircraft in the direction of flight by air exiting the pressurized volume through the outflow valve in the direction opposite to the direction of flight; increases the energy efficiency of an aircraft over its operating life; minimizes outside air inflow and thus reduces the fuel consumption rate of the aircraft; and, reduces the energy required to compress the outside air that is supplied to the aircraft pressurized volume.

In one embodiment of the invention, there is provided a method for reducing outside air inflow required for aircraft passenger cabin air quality, the method comprising the steps of: obtaining a minimum predicted outflow valve open area value required to transport contaminated air from inside the aircraft to outside the aircraft as a function of aircraft altitude and based on a predetermined set of parameters; obtaining a measured outflow valve open area value based on actual operating parameters; using a process controller to compare the predicted outflow valve open area value to the measured outflow valve open area value; determining that an outside air inflow required to maintain the passenger cabin air quality exceeds a set of outside air inflow requirements; and, reducing outside air inflow if the measured outflow valve open area value is greater than the predicted outflow valve open area value.

In another embodiment of the invention, there is provided a method for reducing outside air inflow required for aircraft passenger cabin air quality, the method comprising the steps of obtaining a plurality of independent variables to calculate a predicted outflow valve open area value; using a process controller to calculate the predicted outflow valve open area value; obtaining a measured outflow valve open area value for passenger cabin air quality based on actual operating parameters; using the process controller to compare the predicted outflow valve open area value to the measured outflow valve open area value; determining that an outside air inflow required to maintain the passenger cabin air quality exceeds a set of outside air inflow requirements; and, reducing air inflow if the measured outflow valve open area value is greater than the predicted outflow valve open area value.

In another embodiment, there is provided a method for calculating an aircraft fuselage leakage value and communicating the fuselage leakage value and an increase in a fuel consumption rate due to an additional amount of outside air inflow required to replenish air loss due to fuselage leakage, due to aerodynamic drag, and due to reduced thrust recovery.

BRIEF DESCRIPTION OF THE DRAWINGS

The foregoing and other advantages and features, and the manner in which the same are accomplished, will become more readily apparent upon consideration of the following detailed description taken in conjunction with the accompanying drawings which illustrate preferred and exemplary embodiments, but which are not necessarily drawn to scale, wherein.

DETAILED DESCRIPTION OF THE INVENTION

Figure 1:
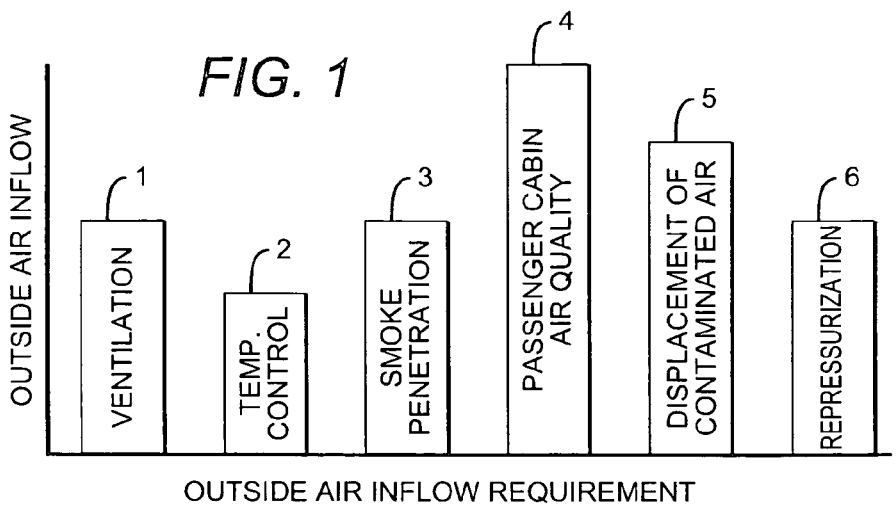
FIG. 1 is a bar graph for passenger cabin air quality outside air inflow versus outside air inflow requirements.

Embodiments of the invention now will be described more fully hereinafter with reference to the accompanying drawings, in which some, but not all embodiments of the invention are shown. Indeed, several different embodiments may be provided and should not be construed as limited to the embodiments set forth herein. Rather, these embodiments are provided so that this disclosure will be thorough and complete and will fully convey the scope of the invention to those skilled in the art. Like numbers refer to like elements throughout.

In one embodiment of the invention, there is provided a method for reducing outside air inflow required for aircraft passenger cabin air quality using a fixed minimum outflow valve open area setpoint. Air is pressurized and it flows out of the outflow valve. The air flow is provided on a continuous basis. Outside air is compressed by the engines, an auxiliary power unit, or generator-powered electric motor-driven compressors which are potential compressed air sources, to provide the inflow to the pressurized volume. A new aircraft has a relatively small fuselage leakage value. However, over the life of an aircraft, the flexible rubber seals around the doors and cargo doors begin to leak more air, increasing the fuselage leakage value. In this embodiment, the method comprises the step of obtaining a minimum predicted outflow valve open area value required to transport contaminated air from inside the aircraft to outside the aircraft as a function of aircraft altitude and based on a predetermined set of parameters. The minimum predicted outflow valve open area value is the outflow valve open area value that, at a measured differential pressure between the ambient environment and the pressurized volume which includes the passenger cabin, allows sufficient outflow valve flow from the pressurized volume to the ambient environment to satisfy the largest amount of air flow. Preferably, the contaminated air comprises heat-laden air, odor-laden air, and particulate-laden air. The predetermined set of parameters may include, but are not limited to, passenger cabin temperature, differential pressure, absolute passenger cabin pressure, air temperature upstream of the respective outflow valve, and outflow valve gate angle. Two primary odor sources on an aircraft are the galleys which include food preparation areas and lavatories. The method further comprises the step of obtaining a measured outflow valve open area value based on actual operating parameters. The measured outflow valve open area value is the outflow valve geometric area value based on feedback from the valve actuator mechanism. The actual operating parameters are the actual current numeric values of each of the predetermined set of parameters that occur in flight.

The method further comprises the step of using a process controller to compare the predicted outflow valve open area value to the measured outflow valve open area value. Preferably, the process controller is software logic. The process controller receives input from the outflow valve as to its current position and compares it to outflow required for the driving parameter, that is, it compares it to standard parameters from a look-up table.

The method further comprises the step of determining that an outside air inflow required to maintain the passenger cabin air quality exceeds a set of outside air inflow requirements. FIG. 1 is a bar graph for passenger cabin air quality outside air inflow versus outside air inflow requirements. FIG. 1 shows a bar graph for passenger cabin air quality outside air inflow with outside air inflow along the y axis versus outside air inflow requirements along the x axis. Preferably, the set of outside air inflow requirements as shown in FIG. 1 comprise aircraft ventilation 1, temperature control 2, preferably passenger cabin temperature control, smoke penetration 3 from one compartment to another, passenger cabin air quality 4, displacement of contaminated air 5, such as heat-laden, odor-laden, and particulate-laden air, and repressurization 6. Smoke penetration outside air inflow is air supplied to the passenger cabin so that, in the case of a fire due to an accidental combustion of cargo in either the forward or aft cargo bays, sufficiently high air velocities are maintained from the passenger cabin or upper portion of the pressurized volume to the lower-lobe or lower portion of the pressurized volume to prevent any smoke from migrating upstream, or upward, into the passenger cabin. These outside air inflow requirements may be fixed and/or variable. The ventilation outside air inflow requirement is a function of the number of passengers on board and is therefore variable by flight. The passenger cabin temperature control outside air inflow requirement is variable, for example, the aircraft might take off from an airport in a cold climate and land at an airport in a hot climate. The smoke penetration outside air inflow requirement is fixed based on the flow area between the passenger cabin and the lower-lobe. The passenger cabin air quality outside air inflow requirement varies with fuselage leakage. The outside air inflow requirement for the displacement of contaminated air can be either fixed or variable flow depending on the variability of internal air-moving systems that add heat, odors, or particulates to the air passing through them. The displacement air flow requirement is based on the need to displace heat-laden air from electronic equipment cooling systems, to displace odor-laden air from the lavatory and galley exhaust system and cargo volumes, and to displace particulates from the cargo volume. The repressurization 6 flow bar indicates additional outside air inflow required to maintain or increase passenger cabin pressure if the aircraft is in descent, commonly known as repressurization. If all the bars in the bar graph of FIG. 1 represent numerically lower values than the passenger cabin air quality bar, then the method of this embodiment is implemented because the outside air inflow requirement for passenger cabin air quality has been determined to be the numerically largest value, so any reduction in this value translates into reduced outside air inflow and increased aircraft efficiency.

The method further comprises the step of reducing outside air inflow into the aircraft, if the measured outflow valve open area value is greater than the predicted outflow valve open area value. The step of reducing outside air inflow additionally comprises the step of the process controller sending a signal to an AC pack controller to reduce outside air inflow.

The method may further comprise the step of increasing outside air inflow if the measured outflow valve open area value is less than the predicted outflow valve open area value. This step of increasing outside air inflow additionally may comprise the step of the process controller sending a signal to an AC pack controller (defined below) to increase outside air inflow. Thus, this embodiment determines the minimum outflow valve open area value, which is a controlled leak path out of the aircraft required to transport all contaminated air overboard as a function of aircraft altitude. When the process controller determines that the passenger cabin air quality outside air inflow requirement is exceeded and all other outside air inflow requirements are numerically lower, the AC pack flow is reduced until the outflow valve modulates to a reduced open area value to allow only contaminated air to be transported overboard. The method of this embodiment controls outside air inflow so the outflow valve flow is minimized.

In another embodiment of the invention, there is provided a method for reducing outside air inflow required for aircraft passenger cabin air quality using calculations that are repeated at regular intervals and using a mathematical function relating the outside air inflow requirements to a set of independent variables. In this embodiment, the method comprises the step of obtaining a plurality of independent variables to calculate a predicted outflow valve open area value. Preferably, the independent variables comprise lavatory galley exhaust air flow, aircraft altitude, nitrogen generation system flow, passenger temperature, pressurized volume pressure, differential pressure between the ambient environment and the pressurized volume which includes the passenger cabin, and Mach number. The Mach number is the ratio of the speed of the aircraft relative to the speed of sound in the air. The independent variables may further comprise any system that transfers air from an aircraft pressurized volume to a region outside the pressurized volume which includes unpressurized volumes of the aircraft and the ambient environment, and in so doing bypasses an outflow valve. The method further comprises the step of using a process controller to calculate the predicted outflow valve open area value. Preferably, the process controller is software logic. The method further comprises the step of obtaining a measured outflow valve open area value for passenger cabin air quality based on actual operating parameters. The method further comprises the step of using the process controller to compare the predicted outflow valve open area value to the measured outflow valve open area value. The method further comprises the step of determining that an outside air inflow required to maintain the passenger cabin air quality exceeds a set of outside air inflow requirements. Preferably, as discussed above, the outside air inflow requirements comprise aircraft ventilation, temperature control, smoke penetration from one compartment to another, and displacement of contaminated air, such as heat-laden, odor-laden, and particulate-laden air (see FIG. 1). The method further comprises the step of reducing air inflow into the aircraft if the measured outflow valve open area value is greater than the predicted outflow valve open area value. The method may further comprise the step of adding logic to calculate an aircraft fuselage leakage value and to communicate the fuselage leakage value and an increase in fuel consumption due to the outside air inflow required to replenish air loss from fuselage leakage, due to increased aerodynamic drag, and due to reduced thrust recovery. Fuselage leakage may be calculated by summing all known flows into, and out of, the fuselage pressurized volume. The difference would be the fuselage leakage, for example, fuselage leakage equals AC pack inflow minus nitrogen generation system outflow. The leakage calculation can be communicated to the pilot or flight crew. Thus, this embodiment, as an alternative to a fixed minimum outflow valve open area setpoint for odor control, uses a mathematical function relating the outside air inflow requirement to a set of independent variables to dynamically update the minimum outflow valve open area value required for passenger cabin air quality removing unnecessary conservatism in the predetermined values and further reducing the outside air consumed by the aircraft. The method further comprises the step of reducing outside air inflow and additionally comprises the step of the process controller sending a signal to an AC pack controller to reduce outside air inflow. The method further comprises the step of increasing outside air inflow if the measured outflow valve open area value is less than the predicted outflow valve open area value. The step of increasing outside air inflow into the aircraft may additionally comprise the step of the process controller sending a signal to an AC pack controller to increase outside air inflow.

Figure 2:
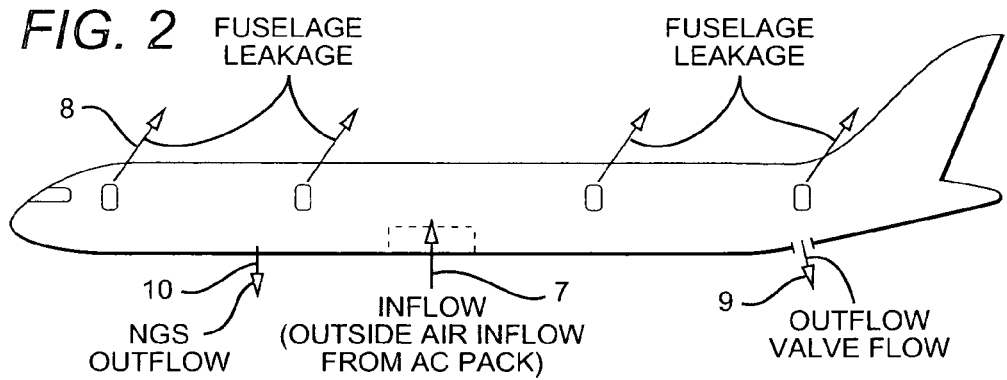
FIG. 2 is an illustration of an aircraft with the outside air inflow and air outflow locations indicated by arrows; and, FIG. 3 is a schematic diagram showing the logic of an embodiment.

FIG. 2 is an illustration of an aircraft with the outside air inflow and air outflow locations indicated by arrows. Inflow 7 or outside air inflow from AC pack, is shown at the bottom of the aircraft as coming from the AC pack or packs. The AC pack or packs are integrated assemblies of air turbines, compressors, fans, heat exchangers, valves and other mechanical components that receive outside air from either the ambient environment or a high pressure source, and produce cool air to pressurize the passenger cabin and cool passengers, cargo, and other equipment inside the pressurized volume. The outflow to the ambient environment outside the aircraft is shown as fuselage leakage 8 exiting around the passenger cabin doors due to door seal leakage and outflow valve flow 9 through the outflow valve. Nitrogen generation system (NGS) outflow 10 from the pressurized volume is also shown.

Figure 3:
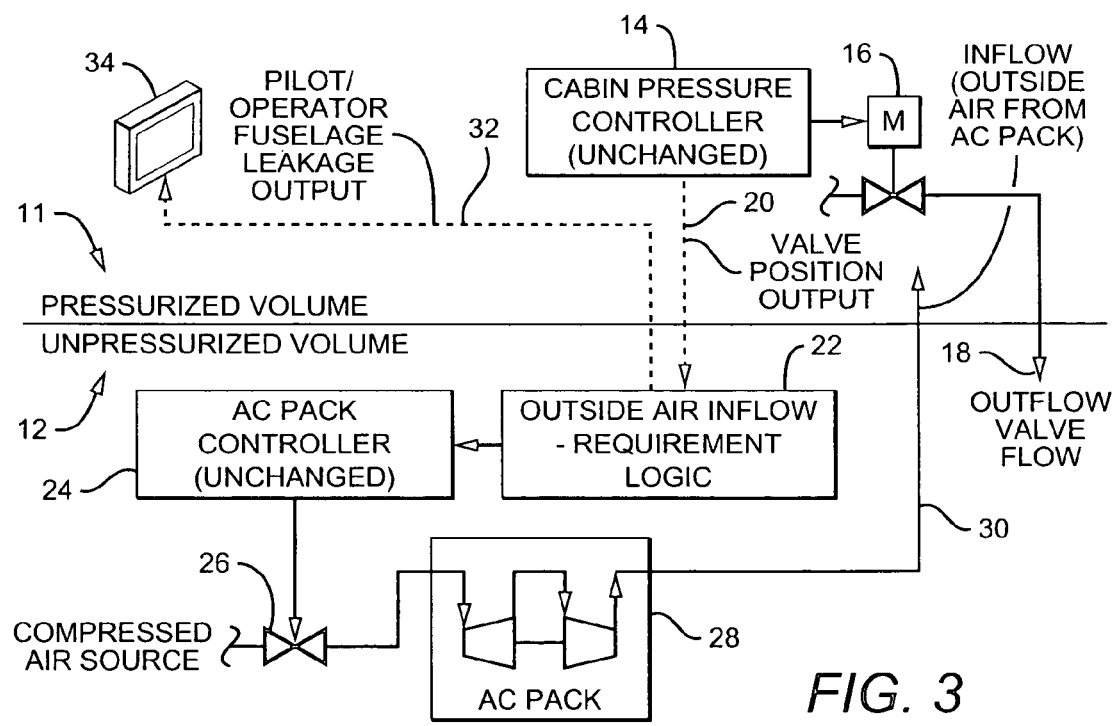

FIG. 3 is a schematic diagram showing the logic of an embodiment where there is provided a method for reducing outside air inflow required for aircraft passenger cabin air quality using a fixed minimum outflow valve open area setpoint. FIG. 3 shows a pressurized volume 11 of the aircraft, that is, interior regions of the aircraft, such as the passenger cabin, cargo compartments and equipment bays, and an unpressurized volume 12 of the aircraft, that is, the wings, AC pack bay, main landing gear bay, and empenage. In the pressurized region 11, there is shown a passenger cabin pressure controller 14 located in the aircraft that determines what pressure the passenger cabin should be depending on a plurality of variables, such as aircraft altitude, the rate of change in aircraft altitude, altitude of the airport where the aircraft will land, and other variables. Most commonly, the passenger cabin pressure controller 14 maintains a constant passenger cabin pressure, such as a passenger cabin pressure that does not vary with time. The passenger cabin pressure controller 14 is connected to a motorized valve 16 that when opened releases air to the ambient environment via an outflow valve flow 18. The passenger cabin pressure controller 14 is also connected via a valve position output 20 to an outside air inflow requirement logic 22, and in turn, to an AC pack controller 24, both located in the unpressurized volume 12. The AC pack controller 24 is connected to a compressed air flow control device, such as a motorized valve 26 or variable speed compressor, which controls compressed air flow from a compressed air source to an AC pack 28. The AC pack 28 supplies air to the pressurized volume of the aircraft via inflow 30 outside air from AC pack or packs. The AC pack controller 24 thereby controls the amount of outside air inflow to the pressurized volume of the aircraft depending on outside air inflow requirements, such as aircraft ventilation, temperature control, smoke penetration from one compartment to another, and displacement of contaminated air. In addition, outside air inflow requirement logic 22 may notify the flight crew of the effects on aircraft fuel consumption of fuselage leakage via pilot/operator or flight deck fuselage leakage output 32 to pilot maintenance message display 34. The outside air inflow requirement logic is defined as the process of first determining if the passenger cabin air quality outside air inflow requirement is the driving outside air inflow requirement when all other outside air inflow requirements, such as passenger cabin ventilation, temperature control, smoke penetration from one compartment to another, the displacement of contaminated air, or repressurization, are determined; second, the determining the outflow valve area value necessary to exhaust heat-laden, and odor-laden, or particulate-laden air through the outflow valve, and reducing the AC pack flow until the outflow valve is only discharging no more than the required air flow.

In another embodiment, there is provided a method for calculating an aircraft fuselage leakage value and communicating the fuselage leakage value and an increase in a fuel consumption rate due to an additional amount of outside air inflow required to replenish air loss due to fuselage leakage, due to aerodynamic drag, and due to reduced thrust recovery. The calculating may be conducted with a controller on an aircraft or conducted with a ground based software. There is provided a method for transmitting or downloading data related to the various parameters necessary to determine fuselage leakage to a ground based computer. The calculation of fuselage leakage could then take place on the ground based computer for use in maintenance planning by an aircraft operator.

The embodiments help to ensure that the amount of outflow valve flow, or air flowing out of the fuselage through the outflow valve is always greater than the amount of contaminant laden air that is being discharged near the outflow valve by ensuring that the AC pack flow, or outside air inflow does not fall below the minimum value required to maintain passenger cabin air quality. The air that is introduced into the aircraft comes from a compressed air source, either the aircraft engine, auxiliary power unit, or a generator-powered electric motor-driven compressor. Therefore energy derived from fuel consumed by the engines is required to supply outside air inflow via the AC packs to the pressurized volume which includes the passenger cabin. If the AC pack flow is reduced, less fuel is consumed. In order to displace all the odor and contaminant laden air overboard, the amount of outside air inflow must equal or exceed the amount of heat-laden, odor-laden, and particulate-laden air being generated within the pressurized volume or region by the internal air moving systems. The embodiments can reduce engine fuel consumption related to a decrease in the energy required by the compressed air source to supply air to the AC packs. Known aircraft designs use a fixed amount, or a fixed minimum amount if AC pack air flow is variable, of AC pack air flow based on a plurality of requirements. The embodiments can allow the air flow to be limited to that needed for the actual aircraft operating parameters. The embodiments may be used in commercial and military aircraft and in other pressurized vehicles where leakage changes over time.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. A method for reducing outside air inflow required for aircraft passenger cabin air quality, the method comprising the steps of:
   obtaining a minimum predicted outflow valve open area value required to transport contaminated air from inside the aircraft to outside the aircraft as a function of aircraft altitude and based on a predetermined set of parameters;
   obtaining a measured outflow valve open area value based on actual operating parameters;
   using a process controller to compare the predicted outflow valve open area value to the measured outflow valve open area value;
   determining that an outside air inflow required to maintain the passenger cabin air quality to compensate for fuselage leakage exceeds each one of a set of outside air inflow requirements other than passenger cabin air quality; and,
   reducing outside air inflow when the measured outflow valve open area value is greater than the predicted outflow valve open area value, and when the outside air inflow required to maintain the passenger cabin air quality to compensate for fuselage leakage is greater than each one of the set of outside air inflow requirements other than passenger cabin air quality.

2. The method of claim 1 wherein the set of outside air inflow requirements comprise aircraft ventilation, temperature control, smoke penetration, displacement of contaminated air, and repressurization.

3. The method of claim 1 wherein the step of reducing air inflow into the aircraft additionally comprises the step of the process controller sending a signal to an AC pack controller to reduce outside air inflow.

4. The method of claim 1 further comprising the step of increasing outside air inflow if the measured outflow valve open area value is less than the predicted outflow valve open area value.

5. The method of claim 4 wherein the step of increasing outside air inflow into the aircraft additionally comprises the step of the process controller sending a signal to an AC pack controller to increase outside air inflow.

6. The method of claim 1 wherein the contaminated air comprises heat-laden air, odor-laden air, or particulate-laden air.

7. The method of claim 1 wherein the process controller is software logic.

8. The method of claim 1 wherein outside air inflow is controlled so an outflow valve flow is minimized.

9. A method for reducing outside air inflow required for aircraft passenger cabin air quality, the method comprising the steps of:
   obtaining a plurality of independent variables to calculate a predicted outflow valve open area value;
   using a process controller to calculate the predicted outflow valve open area value;
   obtaining a measured outflow valve open area value for passenger cabin air quality based on actual operating parameters;
   using the process controller to compare the predicted outflow valve open area value to the measured outflow valve open area value;
   determining that an outside air inflow required to maintain the passenger cabin air quality to compensate for fuselage leakage exceeds each one of a set of outside air inflow requirements other than passenger cabin air quality; and, reducing outside air inflow when the measured outflow valve open area value is greater than the predicted outflow valve open area value, and when the outside air inflow required to maintain the passenger cabin air quality to compensate for fuselage leakage is greater than each one of the set of outside air inflow requirements other than passenger cabin air quality.

10. The method of claim 9 wherein the independent variables comprise lavatory galley exhaust air flow, aircraft altitude, nitrogen generation system flow, passenger cabin temperature, passenger cabin pressure, a differential pressure between an ambient environment and a pressurized volume which includes a passenger cabin, and Mach number.

11. The method of claim 9 wherein the method further comprises the step of calculating an aircraft fuselage leakage value and communicating the fuselage leakage value.

12. The method of claim 9 wherein the independent variables comprise a system that transfers air from an aircraft pressurized volume to an ambient environment outside of the aircraft, and in so doing, bypasses an outflow valve.

13. The method of claim 9 wherein the process controller is software logic.

14. The method of claim 9 wherein the set of outside air inflow requirements comprise aircraft ventilation, temperature control, smoke penetration from a first compartment to a second compartment, displacement of contaminated air, and repressurization.

15. The method of claim 9 wherein the step of reducing outside air inflow additionally comprises the step of the process controller sending a signal to an AC pack controller to reduce outside air inflow.

16. The method of claim 9 further comprising the step of increasing outside air inflow if the measured outflow valve open area value is less than the predicted outflow valve open area value.

17. The method of claim 16 wherein the step of increasing outside air inflow additionally comprises the step of the process controller sending a signal to an AC pack controller to increase outside air inflow.

\* \* \* \* \*